G. MILLER & J. REICHERT,
Assignors, by mesne assignments, to PASSENGER FARE ENUMERATOR AND CLASSIFIER COMPANY.
Alarm-Counter.
No. 9,177. Reissued April 27, 1880.
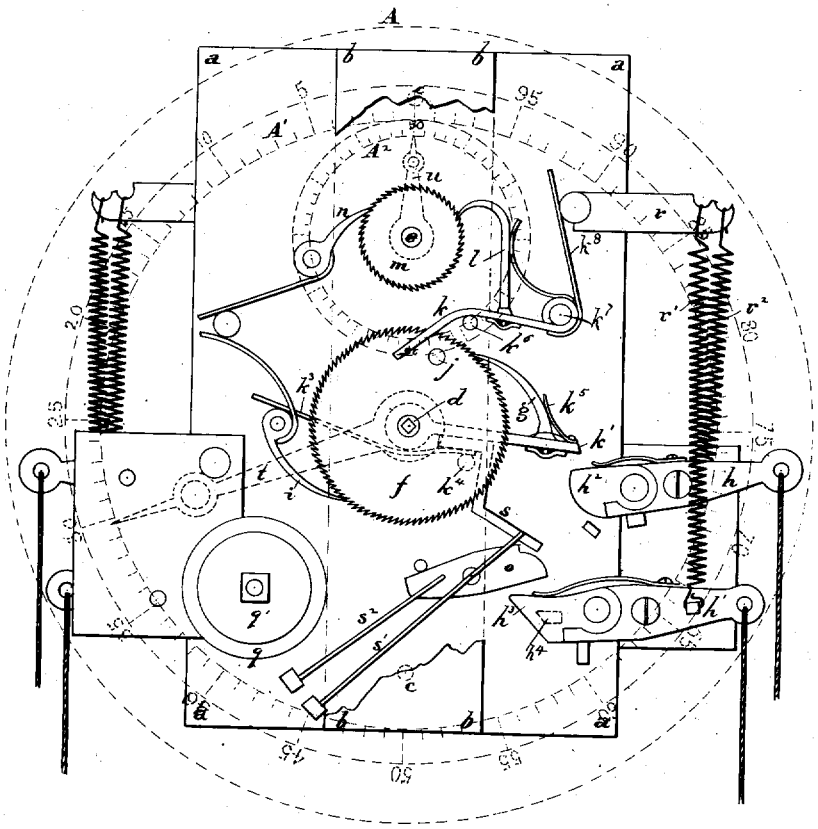
Attests
F. E. Chesterman
Assignees
Passenger Fare Enumerator and Classifier Company.
per Edwin Chesterman
Secretary & Manager.

UNITED STATES PATENT OFFICE.

PASSENGER FARE ENUMERATOR AND CLASSIFIER COMPANY, OF PHILADELPHIA, PENNSYLVANIA, ASSIGNEE, BY MESNE ASSIGNMENTS, OF GEORGE MILLER AND JOHN REICHERT.

ALARM-COUNTER.

SPECIFICATION forming part of Reissued Letters Patent No. 9,177, dated April 27, 1880.

Original No. 57,443, dated August 21, 1866. Application for reissue filed March 5, 1880.

*To all whom it may concern:*

Be it known that GEORGE MILLER and JOHN REICHERT, of the city and State of New York, did invent certain new and useful Improvements in Counters and Alarms, of which the following is a specification.

The invention consists of a counter and an alarm actuated by one handle, the counter being adapted to be set forward to zero independent of the handle and the alarm, and when so set it actuates an indicator or counter; also, of a counter and two alarm mechanisms actuated by either of two external handles, the actuation of one handle causing a greater addition to the count than the actuation of the other handle, and of other devices, which will be more particularly pointed out in the following specification and accompanying drawing, in which—

A is a face-plate, having a figured dial, A′, concentric with arbor *d*, divided into as many numbers as the teeth of the ratchet-wheel *f*, which, in the present case, is one hundred; but this is not arbitrary, the only requirement being that there be sufficient numbers for the count for which the machine is used, and as this rarely, if ever, reaches one hundred, that number is thought sufficient. The point representing the greatest capacity of the counter is the point before the unit, and represents the zero or point of no registration, it being the point from which a start on each new count is made. The face-plate A has also a smaller figured dial, $A^2$, concentric with arbor *e*, and divided into as many numbers as the teeth of ratchet-wheel *m*, which, in the present case, is fifty; but this is not arbitrary, as above described for dial A′.

*a* is a division or base plate, in which the posts, screws, &c., of the mechanisms are placed. *c c* are posts projecting from the base-plate. To these posts the plate *b* and the face or dial plate is fastened by screws.

*f* is a ratchet-wheel, rigidly fastened to the arbor *d*, which has its bearings in plates *a* and *b*, and its upper end projects through the dial, and has rigidly attached an index or pointer, *t*.

*k′* is an arm centered upon and turning around the arbor *d*. $k^3$ is a spring, the tension of which holds said arm in contact with stop $k^4$.

*g* is a pawl pivoted to arm *k′*. A spring, $k^5$, keeps it in contact with the teeth of ratchet-wheel *f*.

*i* is a pawl with spring attached, to prevent backward movement of ratchet-wheel.

*s* is an arm attached to arm *k′*. It carries a hammer, *s′*.

*j* is a pin or disk on wheel *f*

*m* is a ratchet-wheel rigidly fastened to arbor *e*, which has its bearings in plates *a* and *b*, and its upper end projects through the dial and has rigidly attached an index, *u*.

*k* is an arm pivoted to the base-plate at $k^7$, and held by a spring against a stop, $k^6$.

*l* is a pawl pivoted to arm *k*. A spring keeps it in contact with the teeth of ratchet-wheel *m*.

*n* is a pawl with spring attached, to prevent backward movement of ratchet-wheel *m*.

*q q′* are bells.

*o* is a spring-lever, one end of which carries a hammer, $s^2$.

*h* is an actuating-handle pivoted to the base-plate. Its inner end has a jointed spring-toe, $h^2$, rigid in one direction, but pliable in the other direction.

*h′* is also an actuating-handle pivoted to the base-plate. Its inner end has a jointed spring-toe, $h^3$, rigid in one direction, but pliable in the other direction. A lug, $h^4$, projects from the side of this spring-toe.

*r* is a projection, to which springs *r′ r²* are attached, whose office is to hold or return the actuating-handles to position.

The above is a description of the mechanisms on one side of the division or base plate. The other side is an exact counterpart thereof, and requires no further description.

The operation is as follows, the counter being set to the zero or point of no registration: It being desired to make a count, the handle *h* is pressed downward. Its toe $h^2$ comes in contact with arm *k′*, and raises it and the arm *s*, and causes the pawl *g* to turn the ratchet-wheel one tooth, which carries the pointer *t* the space of one number on dial A′. The spring-pawl $i$ falls into the next tooth and prevents backward movement of the ratchet-wheel. The toe $h^2$ passes up out of contact with arm $k'$, and allows said arm to fall under the influence of spring $k^3$, and the hammer $s'$ to strike the bell $q'$. The handle $h$ being then released is returned to its position by spring $r^2$. This operation is repeated each time it is desired to add one to the count.

If it is desired to add five to the count, the handle $h'$ is pressed downward, when its toe $h^3$ comes in contact with lever $o$ and arm $s$, and raises it and arm $k'$, and causes the pawl $g$ to turn the ratchet-wheel five teeth, which carries the pointer $t$ the space of five numbers on dial A′, the spring-pawl $i$ falls into the fifth tooth and prevents backward movement of the ratchet-wheel, the toe $h^3$ passes up out of contact with lever $o$ and arm $s$, and allows said arm to fall under the influence of spring $k^3$, and the hammers $s'$ $s^2$ strike their respective bells. The handle $h'$ being then released is returned to its position by spring $r'$.

It will be seen that the toe $h^3$ is adapted to make a longer engagement with arm $s$ than the toe $h^2$ does with the arm $k'$, and this is why the toe $h^3$ moves the ratchet-wheel five teeth and the toe $h^2$ moves the same ratchet-wheel one tooth.

The end of the count being reached, which in most cases is before or when fifty is shown by pointer $t$ on dial A′, it is desired to set the counter ready for the next count. This is done by turning the pointer $t$ forward until it reaches the last mark before the unit, which represents the point of no registration, or zero, it being the point from which each new count is started, and which, in the present case, represents the hundred-point; and as the pointer $t$ is rigid on the arbor $d$, to which the ratchet-wheel $f$ is fastened, this ratchet-wheel will be turned forward without interfering with the alarm mechanism or the actuating-handle. Before the pointer reaches the zero-point the pin or disk $j$ on ratchet-wheel $f$ comes in contact with the arm $k$ and raises it, carrying the pawl $l$ backward one tooth on ratchet-wheel $m$, and when the zero-point is reached the pin $j$ passes out of contact with arm $k$, which, under the influence of its spring $k^3$, descends and causes its pawl $l$ to turn the ratchet $m$ one tooth and the index $u$ to move on the face of the indicator-dial A² the space of one number.

What is claimed as new is—

1. The combination of a counter and an alarm mechanism actuated by the same handle with an indicator or counter adapted to be actuated independently of the actuating-handle and the alarm mechanism, to indicate or register when the first counter is set to its zero or starting point, substantially as set forth.

2. The combination of a counter and an alarm mechanism actuated by the same handle, a device for turning the counting mechanism to the zero or starting point independent of the actuating-handle and the alarm mechanism, and an indicator or register, the indication or sign of which is changed by means of the device that serves to turn the counting mechanism to its zero or starting point independent of the actuating-handle and the alarm mechanism, substantially as set forth.

3. The combination of a counter and a bell-hammer with two handles projecting outside the case in such manner that the actuation of either handle actuates the counter and trips the bell-hammer, substantially as set forth.

4. The combination of two handles with a counter and an alarm, to denote when a count is made, in such manner that the actuation of either handle trips the bell-hammer, and the actuation of one handle makes a greater addition to the count than is made by the actuation of the other handle, substantially as set forth.

5. The combination of two handles with a counter and two alarm mechanisms in such manner that the actuation of one handle makes a greater addition to the count and a different alarm than is made by the actuation of the other handle, substantially as set forth.

PASSENGER FARE ENUMERATOR & CLASSIFIER CO.,
Per EDWIN CHESTERMAN,
*Secretary and Manager.*

Witnesses:
S. McHENRY,
J. E. CHENEY.